Jan. 8, 1957   P. E. YACOBY   2,776,533
POWER DRIVEN VEHICLE WITH INTERCHANGEABLE ROTARY TOOL
Filed Oct. 11, 1952   3 Sheets-Sheet 1
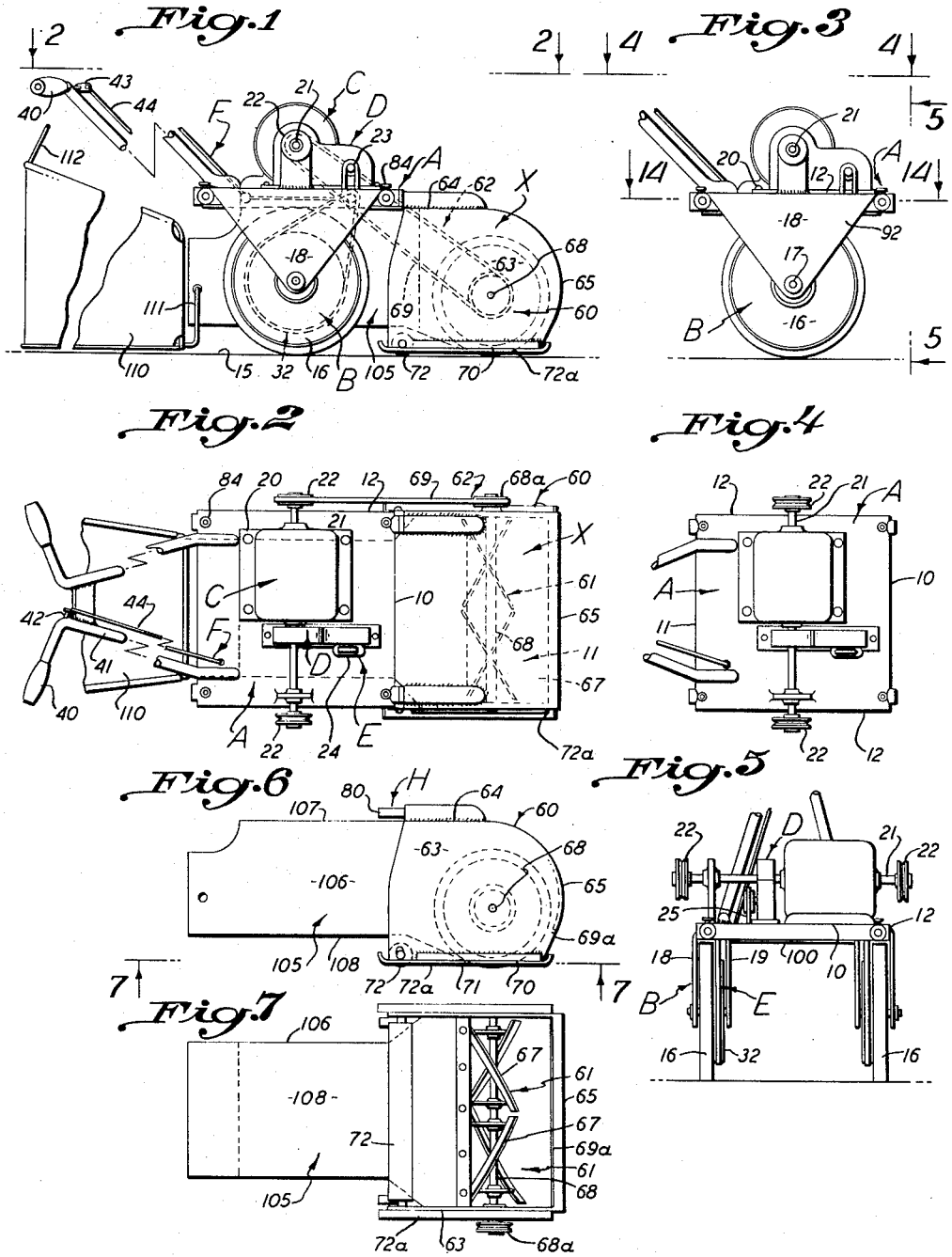
INVENTOR.
PAUL E. YACOBY.
BY
Attorney.

Jan. 8, 1957  P. E. YACOBY  2,776,533
POWER DRIVEN VEHICLE WITH INTERCHANGEABLE ROTARY TOOL
Filed Oct. 11, 1952  3 Sheets-Sheet 2
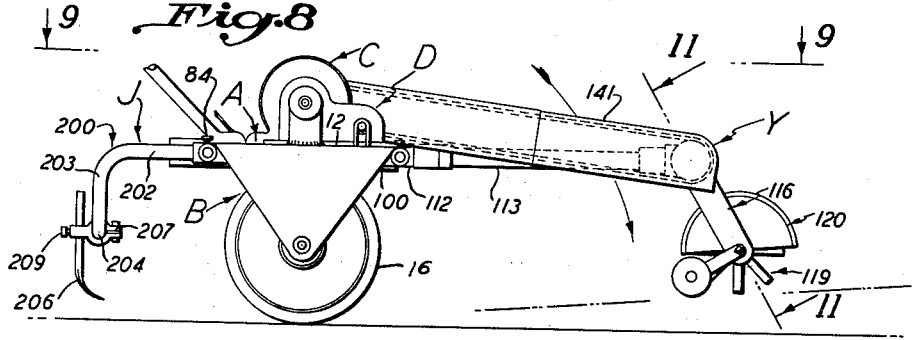
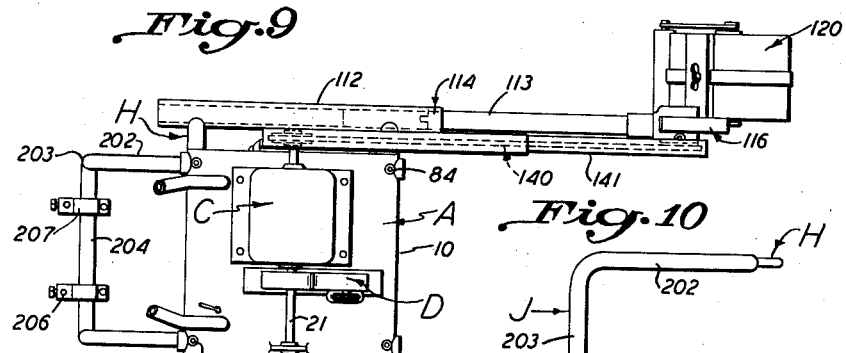
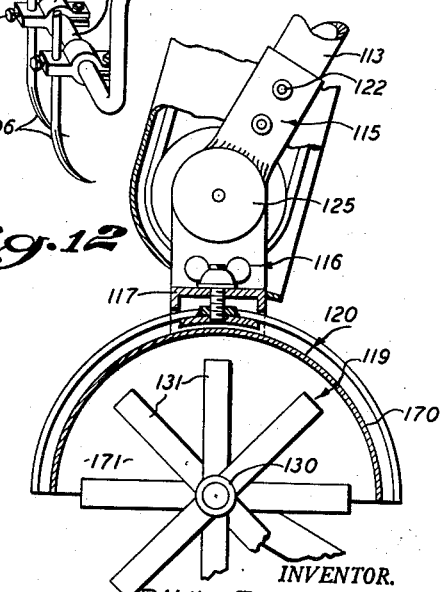
INVENTOR.
PAUL E. YACOBY.
BY
Attorney.

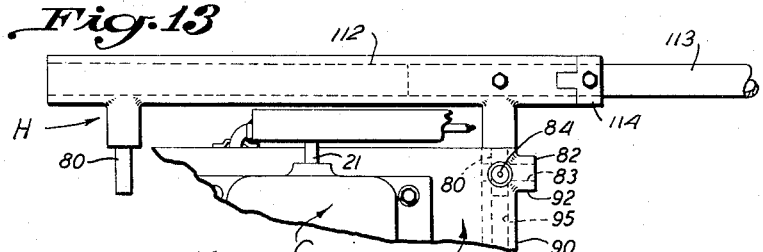
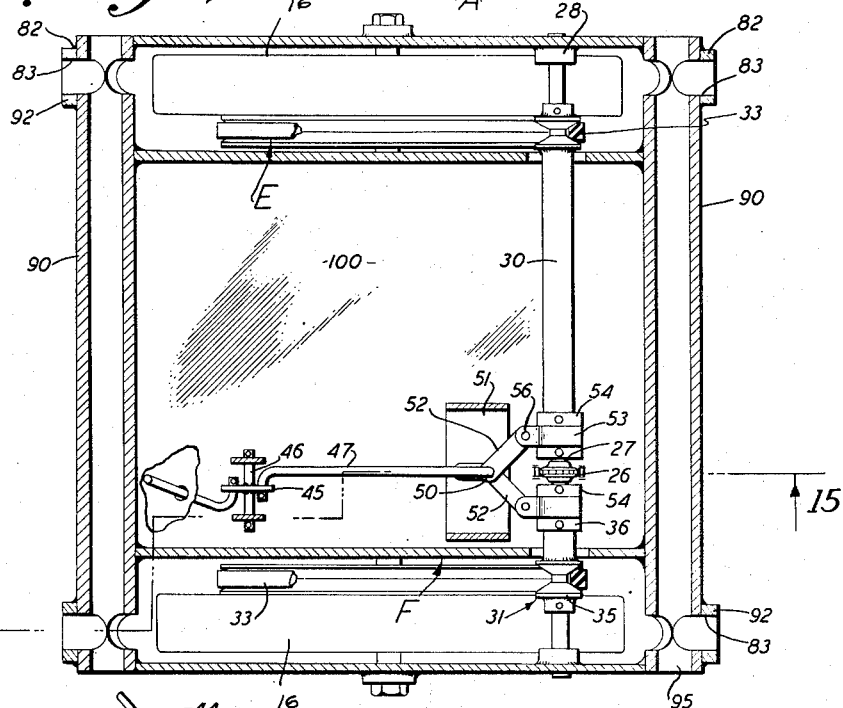
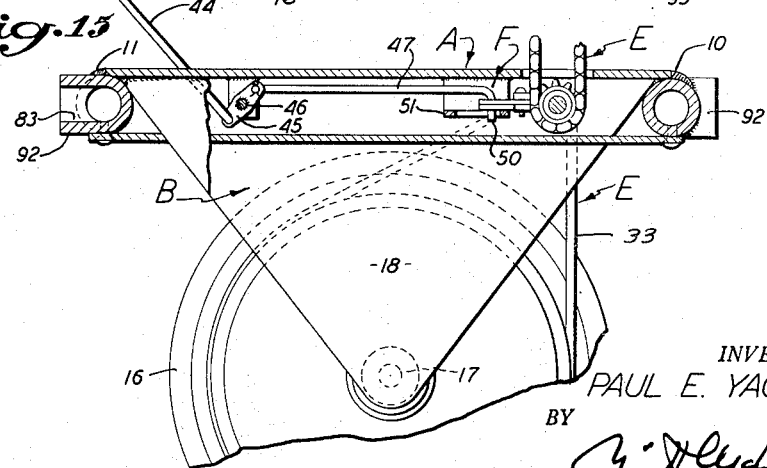

United States Patent Office 2,776,533
Patented Jan. 8, 1957

2,776,533
POWER DRIVEN VEHICLE WITH INTERCHANGEABLE ROTARY TOOL

Paul E. Yacoby, Seal Beach, Calif.

Application October 11, 1952, Serial No. 314,394

14 Claims. (Cl. 56—26)

This invention relates to a power driven garden tool and it is a general object of the invention to provide a simple practical improved structure which is power driven and which is adapted to perform, either alone or in combination, various operations incidental to gardening or cultivating.

This application is filed as a continuation-in-part of my copending application, entitled Garden Tractor With Interchangeable Power Tools, Serial No. 73,038, filed January 27, 1949, now Patent 2,614,473, in which application the invention claimed is concerned with a construction wherein there is a power unit or motor mounted on the structure and adapted to be shifted to various positions relative thereto.

It is an object of this invention to provide a simple practical apparatus characterized by a wheel-supported body with a prime mover fixed thereon, which body is adapted to carry a tool, the structure being such that an operating part of the tool may be energized from or driven by means of the prime mover.

It is another object of this invention to provide a construction of the general character referred to wherein there is a simple practical improved releasable drive from the prime mover to the support wheels, which drive when released permits the apparatus to be freely moved manually with little or no resistance or drag incidental to parts of the drive coupled to the wheels.

Another object of the invention is to provide apparatus of the general character referred to characterized by a tool in the form of a mower combined with a wheel supported body and in which the structure is such that the mower is particularly effective in action and the cuttings therefrom are handled so that they are discharged at the rear of the apparatus where they may, if desired, be received in a catcher.

It is another object of the present invention to provide a structure of the general character referred to wherein a tool carried by the structure is a cultivating device or digger in which a tooth digging implement is adapted to be power operated, the structure including a drive from the prime mover to the digger whereby the digger may be operated as the apparatus is advanced through the action of the prime mover.

It is a further object of this invention to provide apparatus of the general character referred to including various features of construction including a formation and arrangement of parts which serves to provide a simple, practical, effective, dependable mechanism that is convenient to operate and which is inexpensive of manufacture.

The apparatus as provided by the present invention is characterized by a body to which a prime mover is fixed. Supporting wheels carry the body, the wheels being carried by depending brackets confined to the side portions of the body. A releasable drive is provided from the prime mover to the wheels and preferably includes a speed reducing mechanism and a control means is provided for the drive and is preferably manually operable by a person operating the apparatus.

The invention contemplates the combining of a tool with the body and in accordance with the broader aspect of the invention the tool may vary widely in form and construction and may even be a tool adapted to be power driven or operated. In accordance with one aspect of the invention the tool may be a mower, and a means is provided for releasably coupling the case of the mower to the forward end portion of the body, so that the cutter of the mower is below and forward of the body. The mower is constructed so that its rotating cutter induces flow or circulation of the cuttings rearward from the cutter and a duct extends from the case beneath the body and between the supporting wheels so that cuttings are delivered rearwardly at the rear of the body. A drive is provided for the power means to the cutter of the mower.

In the case of another attachment, an extensible or adjustable arm is coupled to the body and has a section projecting forward therefrom and carries a head which supports a digger, a shield, and a drive means for the digger, the drive means being energized from the prime mover on the body.

Another attachment may be in the form of a rake or plow and is preferably coupled to the body to project rearward therefrom and may be characterized by one or more ground engaging elements as circumstances may require.

Having described only a typical preferred form and application of my invention, I do not wish to be limited or restricted to the specific details herein set forth, but wish to reserve to myself any variations or modifications that may appear to those skilled in the art and fall within the scope of the following claims:

Fig. 1 is a side elevation of a machine embodying the present invention showing the machine as including the wheel-supported body carrying the prime mover and having a mower coupled to it and serving to deliver cuttings to a catcher rearward of the body. Fig. 2 is a plan view of the structure shown in Fig. 1 and taken as indicated by line 2—2 on Fig. 1. Fig. 3 is a side elevation of the wheel-supported body shown free of other parts except for the prime mover which is fixed thereon. Fig. 4 is a plan view of the structure shown in Fig. 3 being a view taken as indicated by line 4—4 on Fig. 3. Fig. 5 is an end elevation of the structure shown in Fig. 3, being a view taken as indicated by line 5—5 on Fig. 3. Fig. 6 is a side elevation of the mower shown coupled to the body in Fig. 1 and here shown free of or separate from the other parts. Fig. 7 is a bottom plan view of the mower being a view taken substantially as shown by line 7—7 on Fig. 6. Fig. 8 is a view similar to Fig. 1 with a cultivator attachment shown coupled to the body and projecting forward therefrom, while a rake or plow attachment is coupled to the body and projects rearward therefrom. Fig. 9 is a plan view of the structure being a view taken as shown by line 9—9 on Fig. 8. Fig. 10 is an enlarged perspective view of the rake or plow attachment shown in Figs. 8 and 9. Fig. 11 is an enlarged detailed sectional view taken substantially as indicated by line 11—11 on Fig. 8. Fig. 12 is a detailed transverse sectional view taken substantially as indicated by line 12—12 on Fig. 11. Fig. 13 is an enlarged fragmentary plan view of a portion of the structure shown in Fig. 9. Fig. 14 is an enlarged view taken substantially as indicated by line 14—14 on Fig. 3, and Fig. 15 is a detailed transverse sectional view taken as indicated by line 15—15 on Fig. 14.

The structure embodying the present invention includes, generally, a body A, supporting means B for the body preferably including wheels located below and spaced apart transversely of the body, and a power means C mounted in fixed position on the body. The structure preferably includes a speed-reducing means or mechanism D powered by the prime mover C and a releasable drive means E driven by the prime mover C through the speed-reducer D and serving to operate the wheels of means B. A control means F provides for manual control of the drive means E from handle bars provided on and projecting from the body A.

The invention provides tools and coupling means combining or relating the tools to the body A. In the particular case illustrated a tool X in the nature of a mower is related to the body A by coupling means H. A tool in the form of a cultivator Y is illustrated and is shown coupled to the body A by coupling means H. Further, a tool in the form of a rake or plow J is illustrated and is coupled to the body A by a coupling means H.

The body A of the structure provided by the present invention is preferably a simple flat horizontally disposed element and may in practice be a simple substantially rectangular plate having a front edge 10, a rear edge 11, and side edges 12.

The supporting means B carries the body A for operation over a surface such as a ground surface 15 and in the preferred form of the invention it is a structure characterized by two like wheels located beneath the side edge portions of the body A and below the body A. In the construction provided by the present invention each wheel 16 is carried by a short shaft 17, the ends of which are carried by brackets depending from the side edge portions of the body A. In the preferred construction there is an outer bracket 18 depending from the extreme edge 12 of the body A, and an inner bracket 19 depending from the edge portion of the body at a point somewhat inward of bracket 18. The brackets 18 and 19 are preferably simple flat vertically disposed parts in planes parallel to the longitudinal axis of the structure and they are spaced just far enough apart to accommodate a wheel 16 and necessary parts of the drive means E as hereinafter described.

With the construction provided the outer brackets 18 may be advantageously formed as an integral part of the body A when the body A is a simple plate.

The prime mover C may in practice be any suitable engine or motor and in the case illustrated, and for purpose of simplicity, the prime mover is shown as a simple electric motor fixed to the body A by suitable fasteners 20. The motor has a shaft 21 extending transversely of the structure and in the case illustrated drive pulleys 22 are provided on the motor shaft 21 at each side of the structure, preferably at points just beyond the side edges 12 of the body A.

The speed-reducing means D is shown as coupled to and driven by the motor shaft 21 and in practice may be any suitable speed-reducing means serving to effect the desired speed reduction from the motor shaft 21 to a shaft 23 carrying a drive pulley 24. The drive pulley 24 is in effect a part of the drive means E provided between the prime mover C or the means D driven thereby, and the wheels 16 of the support B.

As stated above, the means D can, in practice, be any suitable speed reducing means, as for instance, it could be a reduction gear belt and pulley, or sprocket and chain type reduction transmission. Since the means D can vary widely, and since the particular running mechanism of the said means is not a novel feature of the present invention, I have illustrated the said means including a simple housing fixed to body A, adjacent to the motor C and receiving the motor shaft 21 and having the shaft 23 carrying the pulley 24, projecting from the housing at a point spaced from the point where the motor shaft is received.

In accordance with the invention the drive from the shaft 23 to the wheels 16 forming the means E includes the drive pulley 24 on the shaft 23 and a belt 25 driven by pulley 24 and engaged with and driving a pulley 26 fixed on a countershaft 27. The countershaft 27 extends transversely of the structure immediately beneath the plate-like body A and its ends are carried by bearings 28 at the inner sides of the outer brackets 18.

In accordance with the present invention sleeves 30 are slidably carried on shaft 27 at opposite sides of or spaced in opposite directions from the pulley 26. Pulleys 31 are carried by the shaft 27 and sleeves 30 in line with pulleys 32 fixed to the wheels immediately adjacent their inner sides, and located between the wheels and the inner brackets as clearly illustrated in Fig. 5 of the drawings. Belts 33 are adapted to be driven by the pulleys 31 and engage the pulleys 32 so that when they are driven the wheels are operated.

The pulleys 31 are releasable pulleys, that is, each is characterized by a section 35 fixed on the shaft 27 and a section 36 fixed on a shiftable sleeve 30. The pulley sections 35 and 36 have opposed pitched peripheral portions adapted to engage and drive a belt 33. In the case of each pulley 31 when the section 36 on the sleeve is moved by the sleeve to closely approach the section 35 belt 33 is gripped and the drive to the wheel is made effective, whereas when it is moved away from section 35 the belt is released so that there is no drive thereto.

In accordance with the present invention, the control means F for the drive is preferably a manually operable mechanism adapted to actuate the sleeves 30 that carry the pulley sections 36. In the case illustrated the control means F includes a handle 40 preferably located on a handle bar 41 projecting upward and rearward from body A. The handle 40 is adapted to operate a shaft 42 carrying a lever 43 and the lever operates a rod 44 that extends to a point beneath the body A where it connects to a lever 45 on a rocker shaft 46. A link 47 connects the lever 45 on a rocker shaft 46 with a toggle mechanism which is characterized by a slide 50 guided for reciprocatory movement by a support 51. Toggle links 52 are pivoted to the slide 50 and each has an outer end pivoted to a collar 53 on a sleeve 30.

In the case illustrated each collar 53 is rotatable on a sleeve 30 and is confined between set stops 54 on the sleeve. The end portion of each link engaged with a collar 53, may be connected thereto by a pivot pin 56.

The construction just described as shown in Figs. 14 and 15 of the drawings is such that the operator of the machine may, by rotating the handle 40, actuate the toggle mechanism so that the sleeves 30 carrying the pulley sections 36 are either moved out to effect drive of the wheels or are moved in so that the drive to the wheels is released. It is notable that when the drive to the wheels is released, there is practically no resistance to movement of the wheels in that the wheels can then be turned freely and the belts 33 engaged with the pulleys 32 are the only parts likely to move with the wheels.

In the particular form of the invention illustrated, there are two handle bars 41 fixed to the body A and projecting upwardly and rearwardly therefrom and each handle bar is provided with a handle at its upper terminal end portion. The handle 40 above described is one of the handles in the structure.

The tool X, which in the case illustrated in the drawings is in the nature of a mower, is preferably releasably secured to body A by coupling means H and in an ordinary or typical application it is so coupled to the body that its major portion projects forward from and downward relative to the body as clearly illustrated in Fig. 1 of the drawings. In the construction illustrated, the mower X includes housing or case 60 carrying a cutter 61 and a drive 62 is provided between the cutter 61 and the motor shaft, preferably through one of the pulleys 22 thereon.

The case 60 of the mower is characterized by flat vertically disposed sides 63, a top 64 which may be substantially flat and horizontal, and a front 65 which is curved as shown in the drawings. The parts 63, 64 and 65 cooperate to define a chamber that opens downwardly and rearwardly and which carries the cutter 61. The cutter 61 may in practice be a typical or conventional cutter such as is employed in a mower and it is illustrated as including blades 67 carried by or from a shaft 68 that extends transversely of the structure to be carried by the sides 63 of the case. The blades are in two like but oppositely pitched groups, the pitching of which is such that as the cutter operates the cuttings are directed somewhat toward the center of the machine rather than to one side as is the case of an ordinary cutter.

The shaft 68 projects from the exterior of the case at one side thereof where the means 62 includes a pulley 68a on the cutter shaft carrying a belt 69 which is engaged with and driven by the pulley 22.

In accordance with the present invention the front wall 65 of case 60 is curved substantially concentric with the cutter, and extends forward and downward from the top 64 to terminate at a straight horizontal edge 69a spaced somewhat above the lower edges 70 of the sides 63. The front 65 terminates so that the edge 69a is just far enough above the ground level 15 to pass material to the cutter and as a result of this construction, as the cutter is rotated or driven within the case, the cutter establishes a circulation or flow of air into the case beneath the edge 69a, so that as cuttings are formed, they are circulated rearwardly. It is to be understood that in practice a suitable blade 71, or the like, can be provided in the structure to cooperate with the rotating cutter 61 and if desired a suitable roller 72 or skids 72a or both can be carried by the case rearward of the cutter 61 and blade 71 in the manner common to mower construction designed for the mowing of grass, or the like and as illustrated in the drawings.

In accordance with the present invention the mounting or coupling means H serves to support the case 60 rigid relative to body A and in accordance with the invention this mounting or coupling means includes pins 80 projecting from the case 60 and engaged with socket parts 82 carried by the body A. In the preferred construction there are two like parallel horizontally spaced pins 80 and the socket parts or members provide correspondingly disposed or related socket openings 83 that receive the pins 80. It is preferred that suitable lock means such as clamp device or set screws 84 be carried by the sockets 82 so that when the pins are in the socket openings 83 they may be releasably set or clamped therein against displacement therefrom.

In the construction illustrated in the drawings the desired socket members 82 are established in connection with the body A by providing tubular elements 90 transversely of the body parallel with and immediately beneath the front and rear edges 10 and 11 of body A. The tubular parts 90 are shown as simple elongate pipe-like sections fixed to the plate that forms the body by welding or the like. When this construction is employed, socket openings are provided in the end portions of each tubular part 90. The socket openings 83 provided to receive pins for supporting a tool forward of body A extended transversely of the tubular element 90 adjacent the edge 10 of body A and bosses 92 are provided projecting forward from this member 90 where the socket openings 83 occur so that the socket openings are a substantial length. In like manner the tubular member 90 provided at the rear edge portion of body A has socket openings 83 extended by bosses 92 and these parts are such as to receive pins of means H serving to couple a tool to the body at the rear thereof.

It is notable from the drawings and particularly from Fig. 14 of the drawings that the socket openings at the front or forward end of the body correspond in spacing to those at the rear end of the body, and it is to be observed that the tubular elements 90 are spaced apart the same distance as each pair of socket openings 83, so that the open end portions 95 of the tubular members 90 at the sides of body A provide socket openings to receive pins when it is desired to attach tools to the sides of the body, that is to either one or the other or both sides of the body.

In the preferred form of the invention parts of the control means E such as the rocker shaft 46, the toggle mechanism, etc., are located immediately beneath the plate forming the body A and they are confined lengthwise of the structure between the two tubular elements 90. A simple cover plate 100 is engaged beneath the body A to cooperate with the parts 90 and the depending brackets 18 to define a clear space beneath the body to house the elements of the means E. The cover plate 100 is shown releasably secured to the under side of the ports 90 by suitable screw fasteners.

In accordance with the present invention the mower X includes in addition to the parts above described, a tubular extension or duct 105 that continues rearward from the case 60 and which includes sides 106, a top 107, and a bottom 108. This duct 105 is open with or to the case 60 to receive cuttings therefrom and opens rearwardly at the rear end of body A so that the cuttings received by it are discharged rearwardly as for instance into a catcher 110 which may be carried in suitable position by suitable releasable mounting means 111 including a tie 112 adapted to support it from the structure formed by the handle bars.

In the case of the tool Y illustrated in Figs. 8, 9, 11 and 12 of the drawings, the mounting means H serves to couple it to one side of body A in which case the pins 80 of the mounting means H projecting from the tool Y enter the ends of the tubular elements 90 to be retained therein by suitable locks such as set screws, or the like. The particular tool Y, as illustrated in the drawings, can be used separate from the mower X hereinabove described, or simultaneously therewith if circumstances so require.

In the case illustrated the tool Y includes an extensible or adjustable arm including a rear section 112 carrying the pins 80 and a forward section 113 telescopically related to section 112 and adapted to be keyed and releasably fixed relative thereto by a lock means 114. The means 114 serves to set the arm sections in predetermined rotative positions 190 degrees apart, and includes a clamp screw, or the like, by which the belt between the sections 112 and 113 can be set against relative movement.

A head is provided at the outer or forward end of the arm section 113 and in the case illustrated it includes a yoke 115 carried by the arm section 113 and supporting a hollow neck 116 provided with a lateral projection 117. A rotatable digger 119 is carried by or from the neck 116 while a shield 120 is provided around a portion of the digger. A suitable drive means 121 is provided for the digger.

The yoke 115 is shown as a sectional structure fixed on the arm section 113 by suitable bolts or fasteners 122 and the neck 116 is shown entered between the sides 125 of the yoke. A boss-like projection 126 on the neck 116 is rotatably supported in one side of the yoke so that the neck can be swung to various rotative positions, that is up or down relative to the terminal end of arm section 113. A suitable stop means or set screw 128 is provided for setting the neck 116 in the desired position.

The digger 119 is shown as a rotary digger characterized by a hub 130 and digger teeth 131 projecting from the hub. A mounting bearing 132 projects from one side of the neck 116 so that it is horizontally disposed and rotatably supports the hub 130 of the digger 119. The drive provided for operating the digger includes a drive belt 140 engaged with a pulley 22 on motor shaft 21 and extending through a housing 141 to a pulley 142 on a shaft 143 concentric with the pivotal mounting of the neck 116. The shaft 143 extends into the neck 116 where it carries a sprocket 150 that drives a chain 151 engaged with a sprocket 152 on a shaft 153 carried in the bearing 132 and fixed to the hub 130 by a fastener 136.

With the construction just described, when the prime mover is in operation, the digger 119 is driven or rotated. The neck 116 can be adjusted to various positions relative to the supporting arm construction. In the preferred construction the roller 160 may be carried by an arm 161 to engage the ground and properly relate the digger teeth 131 thereto.

The guard or shield 120 is shown as a shell-like element having a curved wall 170 substantially concentric with the digger 119 and having flat side walls 171 at each end of the digger 119. In the particular case illustrated, one arm 161 carrying roller 60 is carried by neck 116 while the other is carried by one wall 171 of the guard 120.

The guard 120 is shown supported by the lateral extension 117 of neck 116 and in the case illustrated, a flange 180 is provided on the exterior of the curved wall 170 concentric therewith and a clamp jaw 181 is carried by the projection 117 and is adapted to be operated by a clamp screw 182. When the screw 182 is made tight the guard 120 is securely clamped relative to the projection 117 and so that it is concentric with the digger 119 and is in the desired rotative position relative thereto. Through the construction just described, the shield or guard 120 can be turned to various positions as circumstances may require.

The tool J illustrated in the drawings can be used as circumstances may require and when either one or both of the other tools are in use. In the case illustrated tool J is in the nature of a rake or plow and is characterized by a frame 200 carrying the pins 80 of means H, which pins are preferably engaged in the socket openings 83 at the rear of body A. The frame 200 is shown as including rearwardly extending drawbars 202 with depending parts 203 and a cross bar 204 extends between the parts 203. The teeth or blades 206 are secured to the bar 202 by suitable clamps 207, and suitable clamp screws 209 normally hold the blades 206 in the desired position relative to the clamps 207. Through the construction provided, and which is clearly illustrated in Fig. 10, it will be apparent that the elements 206 can be varied in position as desired. They can be spaced apart transversely of the machine in any suitable manner and can be arranged at a suitable elevation and angle to have the desired action.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A machine of the character described including, a substantially flat horizontally disposed body, a handle bar on the body, a pair of spaced brackets depending from each side edge portion of the body, an independent supporting wheel carried between each pair of brackets, a prime mover stationary on the top of the body, a speed-reducing mechanism fixed on the body and connected to and adapted to be driven by the prime mover, a drive from the said mechanism to the wheels including a counter shaft rotatably supported by and extending transverse the body, a drive from the said mechanism to the counter shaft, two releasable pulleys on the counter shaft, and drive belts from said pulleys to the wheels and occurring between the spaced brackets depending from the body and supporting the wheels, and control means for the pulleys including a manually operable member carried by the handle bar, shiftable elements on the counter shaft and operably related to the pulleys, and a connecting means between the manually operable member and the said elements whereof said elements are adapted to be simultaneously operated into or out of driving engagement with the pulleys by the manually operable member.

2. A machine of the character described including, a substantially flat horizontally disposed body, a handle bar on the body, a pair of spaced brackets depending from each side edge portion of the body, an independent supporting wheel rotatably carried between each pair of brackets and spaced below the body, the wheels being on a common axis transverse of the machine, a prime mover stationary on the top of the body, a speed-reducing mechanism stationary on the top of the body connected to and adapted to be driven by the prime mover, a drive from said mechanism to the wheels including a counter shaft extending transverse and rotatably supported by the body, a drive from said mechanism to the counter shaft, two releasable pulleys on the counter shaft to occur above and between the spaced brackets carrying the wheels, and drive belts from said pulleys to the wheels, and control means for the pulleys including a manually operable member carried by the handle bar, a pair of shiftable sleeves on the counter shaft and operably related to the pulleys, and a connecting means between the manually operable member and the said sleeves whereof said sleeves are adapted to be simultaneously operated by the manually operable member, each pulley including a fixed section and a relatively movable section adapted to be shifted relative to the fixed section and into and out of gripping engagement with the belts, the fixed section of each pulley being fixed to the counter shaft and the movable section being fixed to one of the said shiftable sleeves.

3. A machine of the character described including, a substantially flat horizontally disposed body, a handle bar on the body, a pair of spaced brackets depending from each side edge portion of the body, a supporting wheel rotatably carried between each pair of brackets to occur below the body, a prime mover stationary on the top of the body, a speed-reducing mechanism stationary on the top of the body connected directly to and adapted to be driven by the prime mover, a drive from the said mechanism to the wheels including a counter shaft extending transverse the under side of the body, a drive from the said mechanism through the body and to the counter shaft, a releasable pulley on each end of the counter shaft to occur between the brackets and above the wheels, and belts from said pulleys to the wheels, and control means for the pulleys including a manually operable member carried by the handle bar, shiftable elements on the counter shaft and operably related to the pulleys, and a connecting means between the manually operable member and the said elements whereof said elements are adapted to be operated by the manually operable member, the connecting means including a toggle mechanism adapted to operate said elements simultaneously.

4. A machine of the character described including, a substantially flat horizontally disposed body, a handle bar on the body, a pair of spaced brackets depending from each side edge portion of the body, a supporting wheel carried between each pair of brackets to occur below the plane of the body, a prime mover stationary on the top of the body and having a drive shaft, a speed reducing mechanism stationary on the top of the body connected directly to said shaft to be driven thereby, a drive from the said mechanism to the wheels below the body including a counter shaft extending transverse the underside of the body, two releasable pulleys on the counter shaft to occur above the wheels, and belts from said pulleys to the wheels, and control means for the pulleys including a manually operable member carried by the handle bar, a pair of shiftable tubular elements on the counter shaft between the pulleys and operably related to the pulleys, a connecting means between the manually operable member and the said elements whereof said elements are adapted to be operated simultaneously by the manually operable member, a tool having a rotary part adapted to be power operated, pin and socket means releasably connecting the tool to the body, and drive means from the drive shaft of the prime mover to said rotating part of the tool.

5. A machine of the character described including, a substantially flat horizontally disposed body, a handle bar on the body, a pair of spaced brackets depending from each side edge portion of the body, a supporting wheel carried between each pair of brackets, a prime mover stationary on the body and having a drive shaft, a speed reducing mechanism on the body connected to said shaft to be driven thereby, a drive from the said mechanism to the wheels including a counter shaft, two releasable pulleys on the counter shaft, and belts from said pulleys to the wheels, and control means for the pulleys including a manually operable member carried by the handle bar, shiftable elements on the counter shaft and operably related to the pulleys, a connecting means between the manually operable member and the said elements whereof said elements are adapted to be operated by the manually operable member, a tool having a sectional arm adapted to be varied in length, means releasably connecting one section of the arm to the body, a rotary cutter carried by the other section of the arm and a drive from the shaft of the prime mover to the rotary cutter.

6. A machine of the character described including, a substantially flat horizontally disposed body, a handle bar on the body, a pair of spaced brackets depending from each side edge portion of the body, a supporting wheel carried between each pair of brackets, a prime mover stationary on the body and having a drive shaft, a speed reducing mechanism on the body connected to said shaft to be driven thereby, a drive from the said mechanism to the wheels including a counter shaft, two releasable pulleys on the counter shaft, and belts from said pulleys to the wheels, and control means for the pulleys including a manually operable member carried by the handle bar, shiftable elements on the counter shaft and operably related to the pulleys, a connecting means between the manually operable member and the said elements whereof said elements are adapted to be operated by the manually operable member, a tool having a sectional arm adapted to be varied in length, means releasably connecting one section of the arm to the body, a neck carried by the other arm section and adapted to be adjusted relative thereto, a rotary cutter carried by the neck, and a drive from the shaft of the prime mover to the cutter.

7. A machine of the character described including, a substantially flat horizontally disposed body, a handle bar on the body to project rearwardly and upwardly therefrom, a pair of spaced brackets depending from each side edge portion of the body, a supporting wheel carried between each pair of brackets, a prime mover fixed on the top of the body and having a drive shaft, a speed reducing mechanism fixed on the top of the body and connected directly to said shaft to be driven thereby, a drive from the said mechanism to the wheels including a counter shaft rotatably carried by the body at the underside thereof, a releasable pulley at each end of the counter shaft, and belts from said pulleys to the wheels, and control means for the pulleys including a manually operable member carried by the handle bar, longitudinally shiftable tubular elements on the counter shaft and operably related to the pulleys, a connecting means between the manually operable member and the said elements whereof said elements are adapted to be operated by the manually operable member, a tool having a case open at the bottom and rear side thereof, means releasably mounting the case on the body forward thereof, a rotary cutter carried by and within the case, a belt drive from the shaft of the prime mover to the cutter, and a tubular duct fixed to and extending rearward from the case to occur beneath the body and between the pairs of brackets.

8. A machine of the character described including, a substantially flat horizontally disposed body, a rearwardly and upwardly projecting handle bar on the body, a pair of laterally spaced brackets depending from each side edge portion of the body, a supporting wheel rotatably carried between each pair of brackets, a prime mover fixed on the top of the body and having a drive shaft, a speed reducing mechanism fixed on the top of the body and connected directly to said shaft to be driven thereby, a drive from the said mechanism to the wheels including a counter shaft rotatably carried by the body, two releasable pulleys on the counter shaft, and belts from said pulleys to the wheels, and control means for the pulleys including a manually operable member carried by the handle bar, longitudinally shiftable tubular elements on the counter shaft and operably related to the pulleys, a connecting means between the manually operable member and the said elements whereof said elements are adapted to be operated by the manually operable member, a tool having a case open at the bottom and rear side thereof, pin and socket means releasably mounting the case on the front of the body, a rotary cutter carried by and within the case, a drive from the shaft of the prime mover to the cutter, a tubular duct fixed to and extending rearwardly from the case to occur beneath the body and between the pairs of brackets, and a catcher for cuttings releasably connected to the duct and adapted to receive cuttings from the cutter and handled by the duct.

9. A machine of the character described including, a substantially flat horizontally disposed body, a handle bar projecting upwardly from the rear of the body, a pair of spaced brackets depending from each side edge portion of the body, a supporting wheel rotatably carried between each pair of brackets, a prime mover fixed on the top of the body and having a drive shaft, a speed reducing mechanism fixed on the top of the body and connected directly to said shaft to be driven thereby, a drive from the said mechanism to the wheels including a counter shaft, two releasable pulleys on the counter shaft, and belts from said pulleys to the wheels, and control means for the pulleys including a manually operable member carried by the handle bar, longitudinally shiftable tubular elements on the counter shaft and operably related to the pulleys, a connecting means between the manually operable member and the said elements whereof said elements are adapted to be operated by the manually operable member, a tool having a case open at the bottom and rear side thereof, means releasably mounting the case on the body forward thereof, a rotary cutter carried by and within the case, a drive from the shaft of the prime mover to the cutter, and a tubular duct fixed to and extending rearward from the case to occur beneath the body and between the pairs of brackets, the case having a curved front wall extending around the cutter and terminating to leave an opening at the front of the cutter and large enough to receive material to be cut.

10. A machine of the character described including, a substantially flat horizontally disposed body, a handle bar projecting rearwardly and upwardly from the rear of the body, a pair of spaced brackets depending from each side portion of the body, a supporting wheel rotatably carried between each pair of brackets to occur below the plane of the body, a prime mover fixed on the top of the body and having a drive shaft, a speed reducing mechanism fixed on the top of the body adjacent the prime mover and connected to said shaft to be driven thereby, a drive from the said mechanism to the wheels including a counter shaft extending transverse the body, two releasable pulleys on the counter shaft to occur above the wheels, and belts from said pulleys to the wheels, and control means for the pulleys including a manually operable member carried by the handle bar, longitudinally shiftable tubular elements on the counter shaft and operably related to the pulleys, a connecting means between the manually operable member and the said elements whereof said elements are adapted to be operated simultaneously by the manually operable member, a work engaging tool adapted to be moved relative to the work by the machine and having a part adapted to be power operated, means releasably connecting the tool to the body, and drive means from the drive shaft of the prime mover to said part of the tool, the body having laterally spaced parallel socket openings therein and the means connecting the tool to the body including laterally spaced parallel pins carried by and projecting from the tool and releasably carried by the sockets.

11. A machine of the character described including, a substantially flat horizontally disposed body, a handle bar on the body, a pair of laterally spaced brackets depending from each side edge portion of the body, a supporting wheel rotatably carried between each pair of brackets to occur below the plane of the body, a prime mover fixed on the top of the body and having a drive shaft, a speed reducing mechanism fixed on the top of the body adjacent the prime mover and connected directly to said shaft to be driven thereby, a drive from the said mechanism to the wheels including a counter shaft extending transverse the body, two releasable pulleys on the counter shaft to occur above the wheels, and belts from said pulleys to the wheels, and control means for the pulleys including a manually operable member carried by the handle bar, longitudinally shiftable tubular elements on the counter shaft and operably related to the pulleys, a connecting means between the manually operable member and the said elements whereof said elements are adapted to be simultaneously operated by the manually operable member, a work engaging tool adapted to be moved relative to the work by the machine and having a part adapted to be power operated, means releasably connecting the tool to the body, and drive means from the shaft of the prime mover to said part of the tool, the body having two laterally spaced tubular parts fixed thereto and having transverse openings at their end portions whereby there is a pair of laterally spaced socket openings at each edge portion of the body, the means connecting the tool to the body including, a pair of laterally spaced pins carried by and projecting from the tool and releasably held in one of said pairs of sockets.

12. A machine of the character described including, a mower having a case, a duct extending rearward from the case, and a rotary cutter in the case, a substantially flat horizontally disposed body to occur above the duct, a pair of wheels, means depending from the side edge portions of the body to occur at opposite sides of the duct and carrying the wheels, the said means cooperating with the body to define a downwardly opening passage extending longitudinal of the machine and freely receiving the duct, a prime mover on the body, a releasable drive from the prime mover to the wheels, means releasably connecting the case of the mower to the body to be carried thereby forward thereof with the duct extending through said passage, and a drive from the prime mover to the cutter.

13. A machine of the character described including, a mower having a case, a duct fixed to and extending rearward from the case, and a rotary cutter in the case, a substantially flat horizontally disposed body, a pair of wheels, means depending from the side edge portions of the body and carrying the wheels and cooperating with the body to define an unobstructed downwardly opening passage extending longitudinal of the machine and adapted to freely receive the duct, a prime mover on the body, a releasable drive from the prime mover to the wheels, means releasably connecting the case of the mower to the body to be carried thereby forward thereof with the duct extending rearwardly through said passage, a drive from the prime mover to the cutter, and a catcher for cuttings detachably mounted at the rear of the duct to receive cuttings therefrom.

14. A machine of the character described including, a mower having a case, a duct fixed to and extending rearward from the case, and a cutter rotatably carried in the case, a substantially flat horizontally disposed body, a pair of wheels, means depending from the side edge portions of the body and rotatably carrying the wheels and cooperating with the body to define an unobstructed downwardly opening passage extending longitudinal of the machine and adapted to receive the duct, a prime mover fixed on the top of the body, a releasable drive from the prime mover to the wheels, means releasably connecting the case of the mower to the body to be carried thereby forward thereof with the duct extending through said passage, and a drive from the prime mover to the cutter, the body having a pair of laterally spaced forwardly opening sockets, and the means connecting the case and body including a pair of laterally spaced pins carried by the case and projecting into the sockets.

References Cited in the file of this patent

UNITED STATES PATENTS

| | | |
|---|---|---|
| 1,512,596 | Hamshaw | Oct. 21, 1924 |
| 1,669,471 | Jones | May 15, 1928 |
| 2,185,659 | Chernow | Jan. 2, 1940 |
| 2,322,268 | Zink et al. | June 22, 1943 |
| 2,368,290 | Donald | Jan. 30, 1945 |
| 2,523,171 | Willey | Sept. 19, 1950 |
| 2,538,230 | Boggs | Jan. 16, 1951 |
| 2,582,966 | Curtis | Jan. 22, 1952 |

FOREIGN PATENTS

| | | |
|---|---|---|
| 447,708 | France | Nov. 5, 1912 |